United States Patent
Fallis, III et al.

(10) Patent No.: US 7,523,977 B2
(45) Date of Patent: Apr. 28, 2009

(54) MODULAR CONVERTIBLE TOP

(75) Inventors: Robert E. Fallis, III, Rochester, MI (US); Michael T. Willard, Harrison Township, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 0 days.

(21) Appl. No.: 11/825,942

(22) Filed: Jul. 10, 2007

(65) Prior Publication Data

US 2007/0257521 A1 Nov. 8, 2007

Related U.S. Application Data

(63) Continuation of application No. 11/017,165, filed on Dec. 20, 2004, now Pat. No. 7,240,960.

(60) Provisional application No. 60/530,770, filed on Dec. 18, 2003, provisional application No. 60/530,718, filed on Dec. 18, 2003, provisional application No. 60/530,593, filed on Dec. 18, 2003, provisional application No. 60/530,710, filed on Dec. 18, 2003.

(51) Int. Cl.
  *B60J 7/12* (2006.01)
(52) U.S. Cl. .................................. 296/118; 296/107.09
(58) Field of Classification Search ................. 296/218, 296/219, 118, 107.09, 111; 280/756
See application file for complete search history.

(56) References Cited

U.S. PATENT DOCUMENTS

| 1,873,990 | A | | 8/1932 | Alexander |
| 2,210,590 | A | * | 8/1940 | Jobst ..................... 296/107.17 |
| 2,460,399 | A | | 2/1949 | Schassberger |
| 2,463,646 | A | | 3/1949 | Schassberger |
| 2,620,224 | A | | 12/1952 | Hedley |
| 2,682,427 | A | | 6/1954 | Bright |
| 3,055,700 | A | | 9/1962 | Glas |
| 3,167,349 | A | | 1/1965 | Young et al. |
| 3,419,304 | A | | 12/1968 | Sangimino |
| 4,070,056 | A | | 1/1978 | Hickman |
| D250,330 | S | | 11/1978 | Hickman et al. |
| 4,179,152 | A | | 12/1979 | Kent, Jr. |
| 4,188,963 | A | | 2/1980 | Janoe et al. |
| D257,531 | S | | 11/1980 | Hickman et al. |
| 4,260,188 | A | | 4/1981 | Bauer |
| D259,340 | S | | 5/1981 | Stengel |
| D268,408 | S | | 3/1983 | Ruggles |
| 4,600,235 | A | | 7/1986 | Frederick et al. |
| 4,644,699 | A | | 2/1987 | Chandler et al. |
| 4,659,136 | A | | 4/1987 | Martin et al. |
| 4,730,870 | A | | 3/1988 | DeRees |

(Continued)

FOREIGN PATENT DOCUMENTS

GB  635325  4/1950

(Continued)

*Primary Examiner*—Dennis H Pedder
(74) *Attorney, Agent, or Firm*—Brooks Kushman P.C.

(57) ABSTRACT

A removable top system for a vehicle having a front removable roof section and a rear removable roof section. Different removable roof coverings may be interchangeably combined to provide a complete roof for a sport utility vehicle having a permanent hoop dividing the front and rear roof sections. Soft top and hard top roof coverings are selectively provided. Different retraction mechanisms are disclosed for retracting and storing the removable roof sections.

3 Claims, 8 Drawing Sheets

U.S. PATENT DOCUMENTS

| | | |
|---|---|---|
| 4,733,902 A | 3/1988 | Rabb |
| 4,757,854 A | 7/1988 | Rippberger |
| 4,784,429 A | 11/1988 | Hodges |
| 4,850,634 A | 7/1989 | Taubitz |
| 4,881,298 A | 11/1989 | Turnbull |
| 4,930,835 A | 6/1990 | Bruce et al. |
| 4,938,519 A | 7/1990 | Schlachter |
| D310,806 S | 9/1990 | Hertzberg et al. |
| 4,953,903 A | 9/1990 | Warner |
| 5,018,783 A | 5/1991 | Chamings et al. |
| D322,055 S | 12/1991 | Bruce et al. |
| 5,203,603 A | 4/1993 | Hertzberg et al. |
| 5,299,850 A | 4/1994 | Kaneko et al. |
| 5,324,089 A | 6/1994 | Schlachter |
| 5,560,671 A | 10/1996 | Ojanen et al. |
| 5,673,959 A | 10/1997 | Padlo |
| 5,687,895 A | 11/1997 | Allison et al. |
| 5,702,147 A | 12/1997 | Essig |
| 5,725,273 A | 3/1998 | Vernon et al. |
| 5,738,405 A | 4/1998 | Richters et al. |
| 5,765,903 A | 6/1998 | Essig et al. |
| 5,775,767 A * | 7/1998 | Harrison et al. ........ 296/107.09 |
| 5,803,529 A | 9/1998 | Perry-Bores et al. |
| 5,829,195 A | 11/1998 | Ojanen |
| 5,941,595 A | 8/1999 | Schroeder et al. |
| 5,947,546 A | 9/1999 | Hilliard et al. |
| 5,979,968 A | 11/1999 | Essig et al. |
| 5,979,969 A | 11/1999 | Hilliard et al. |
| 5,992,917 A | 11/1999 | Hilliard et al. |
| 6,003,936 A | 12/1999 | Gordon |
| 6,036,256 A | 3/2000 | Hilliard et al. |
| 6,062,630 A | 5/2000 | Taylor |
| 6,073,989 A | 6/2000 | Hilliard et al. |
| 6,149,217 A | 11/2000 | Plamondon |
| 6,189,962 B1 | 2/2001 | Henderson |
| 6,203,100 B1 | 3/2001 | Gordon |
| 6,206,454 B1 | 3/2001 | Cory |
| D442,911 S | 5/2001 | Essig |
| 6,237,981 B1 | 5/2001 | Selleck |
| 6,241,305 B1 | 6/2001 | Troeger et al. |
| 6,286,888 B1 | 9/2001 | Essig |
| 6,295,713 B1 | 10/2001 | Hilliard et al. |
| 6,309,007 B1 | 10/2001 | Essig et al. |
| 6,338,522 B1 | 1/2002 | LeBlanc |
| 6,409,248 B1 | 6/2002 | Bores |
| 6,439,643 B2 | 8/2002 | Barker |
| 6,468,149 B2 | 10/2002 | Essig et al. |
| D469,421 S | 1/2003 | Stickles et al. |
| 6,508,505 B1 * | 1/2003 | Perry .................... 296/187.06 |
| 6,530,621 B1 | 3/2003 | Williams et al. |
| D474,145 S | 5/2003 | Dawson et al. |
| 6,588,824 B2 | 7/2003 | Neubrand |
| D481,987 S | 11/2003 | MacWilliam |
| 6,655,725 B2 | 12/2003 | Soldatelli |
| 6,688,668 B2 | 2/2004 | Stevens et al. |
| 6,690,802 B2 | 2/2004 | Stickles et al. |
| 6,866,322 B2 * | 3/2005 | Willard ................. 296/107.01 |
| 2004/0130188 A1 | 7/2004 | Stevens et al. |

FOREIGN PATENT DOCUMENTS

| | | |
|---|---|---|
| JP | 405112142 | 5/1993 |

\* cited by examiner

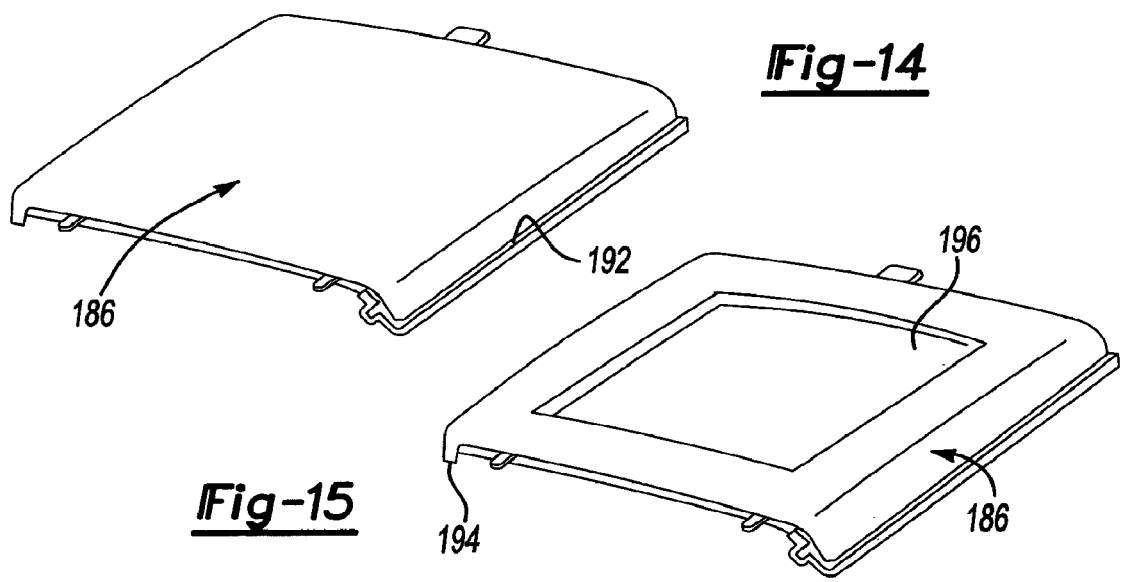
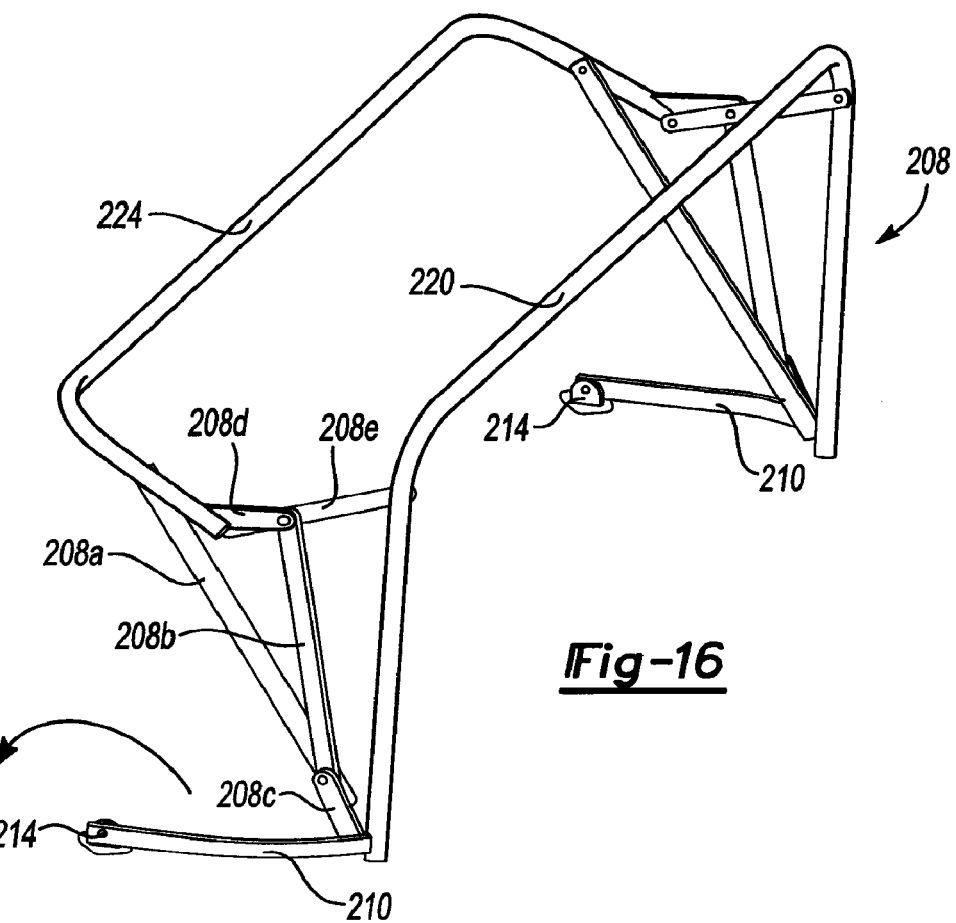

MODULAR CONVERTIBLE TOP

CROSS-REFERENCE TO RELATED APPLICATIONS

This application is a continuation of U.S. application Ser. No. 11/017,165, filed Dec. 20, 2004 now U.S. Pat. No. 7,240,960 and claims the benefit of U.S. provisional application Ser. No. 60/530,770, filed Dec. 18, 2003; Ser. No. 60/530,718, filed Dec. 18, 2003; Ser. No. 60/530,593, filed Dec. 18, 2003; and Ser. No. 60/530,710, filed Dec. 18, 2003.

BACKGROUND OF THE INVENTION

1. Field of the Invention

The present invention relates to a modular convertible top for a vehicle.

2. Background Art

Vehicles such as sport utility vehicles, pick up trucks and the like are popular with consumers because of their versatility. One way to increase the comfort, convenience and market for such vehicles is to provide a convertible roof. Convertibles may have a rigid or flexible roof that may be removed to open the cabin of a vehicle or provide additional clearance for storing large objects in the storage compartment.

One way to provide a convertible sport utility vehicle is to provide a completely removable rigid roof shell structure. However, one disadvantage of this approach is that it is difficult to store the roof structure after it is removed from the vehicle. The roof structure is too large to store on the vehicle and must be left, for example, in a person's garage.

A snap on flexible cover made of cloth, canvas, or vinyl may be used as a removable roof structure. Removable flexible roof covers are normally provided with many snap closure elements and zippers. Attaching and removing flexible roofs from vehicle is time consuming and labor intensive but does provide a top that may be removed and stored in the vehicle. Soft tops must be carefully folded as they are removed to prevent damage to the removable soft top. If the removable soft top is not carefully removed and stored, snaps can be torn from the cover and flexible window elements or canvas sections can be damaged.

Removable soft top covers also suffer from disadvantages relating to vehicle noise and vibration. When a sport utility vehicle having a flexible cover is driven, particularly at high speeds, the cover can vibrate causing high noise levels. Further, removable flexible covers are inferior to rigid removable roof when used in foul weather because they are more prone to leakage. In cold climates flexible vehicle covers offer little insulation and are difficult to effectively heat.

The present invention is directed to providing a solution to the above problem.

SUMMARY OF THE INVENTION

According to one aspect of the present invention a removable roof system for a vehicle having a permanent hoop dividing the roof area of the vehicle into a front roof area and a rear roof area is provided. The removable roof system comprises a front roof section including a covering portion that may be selectively secured to the vehicle to cover the front roof area. The front roof section extends from a header to the hoop and between a removable right side rail and a removable left side rail that are provided on right and left sides of the front roof section. A rear roof section is provided that includes a top portion, a back portion and two opposed side portions. The rear roof section is selectively secured to the vehicle behind the permanent hoop to cover the rear roof area.

Other aspects of the invention relating to the front roof section may comprise providing a covering portion is a flexible fabric member. The flexible fabric member may be supported by a central longitudinally extending bar, right and left sides longitudinally extending bars and front and rear pivoting links. Alternatively, the covering portion may be a right rigid panel that has a first interlocking support channel extending longitudinally on a left edge and a left rigid panel that has a second interlocking support channel extending longitudinally on a right edge. A right and left rigid panels may have a transparent portion. If the covering portion is a flexible fabric member it may be retracted by folding the covering portion into a plurality of pleats that fold the covering portion transversely so that the covering portion may be removed from the front roof area after folding and stored in a storage space within the vehicle. Alternatively, the front roof section may be a flexible fabric member that is retained on a rear edge on a roller that is supported for rotation by the permanent hoop. The flexible fabric member may be retracted by rolling the flexible fabric member onto the roller and may be extended to cover the front roof area by rolling the flexible fabric member from the roller and attaching a front edge to the windshield header.

Other aspects of the invention relating to the rear roof section include providing a top portion of the rear roof section that is the flexible fabric member. In one aspect of the invention the top portion may be retracted by folding the top portion into a plurality of pleats that fold the top portion transversely. The top portion may be removed from the rear roof area after folding and may be stored in a storage space within the vehicle. In addition, the rear portion may be folded into pleats with the top portion prior to being removed from the vehicle.

According to another aspect of the invention relating to the rear roof section relates to the structure of the side portions. The side portions may be a rigid panel that is detachably secured to the rear quarter panels of the vehicle, the permanent hoop and the top and back portions of the rear roof section. The rigid removable side panels may also be provided in conjunction with a rigid top portion and a rigid rear window.

According to another alternative embodiment the top portion and opposed side portions may be flexible fabric members that are secured to a rigid back light frame. The back light frame may be shifted between an extended position in which the back light frame is disposed above a tailgate of a vehicle and retracted position in which the back light frame is disposed rearwardly adjacent the permanent hoop. The top portions and opposed side portions are gathered and stored in association with the back light frame and permanent hoop in the retracted position. The back portion of the rear roof section may comprise a back light that is retracted into the tailgate. A rigid shell top may be assembled over the rear roof area and secured to the back light frame, right and left rear quarters and the tailgate.

According to another aspect of the invention relating to the rear roof section, the top portion and rear portions made of flexible fabric members that are supported by a plurality of bows that extend transversely between two opposed side portions. The two opposed side portions may be rigid members that are detachable supported on the vehicle and may be detached from the vehicle separately from the top portion and rear portion. The bows may be inverted U-shaped members having ends that are attached to a quarter panel of the vehicle in a moveable relationship. The top portion and rear portion are folded rearwardly to rest upon the tailgate when the rear roof section is a retracted position.

The front and rear roof section may be provided in different combinations depending upon the requirements of a particular vehicle application.

BRIEF DESCRIPTION OF THE DRAWINGS

FIG. 14 is a perspective view of a rigid front roof panel section of the hard top roof system;

FIG. 15 is a perspective view of an alternate embodiment of a rigid front roof panel section with a skylight of the hard top roof system;

FIG. 16 is a perspective view of an alternate embodiment of an articulated support frame for a rear roof section soft top cover in a nearly fully extended position;

DETAILED DESCRIPTION OF THE PREFERRED EMBODIMENT(S)

Figure 1:
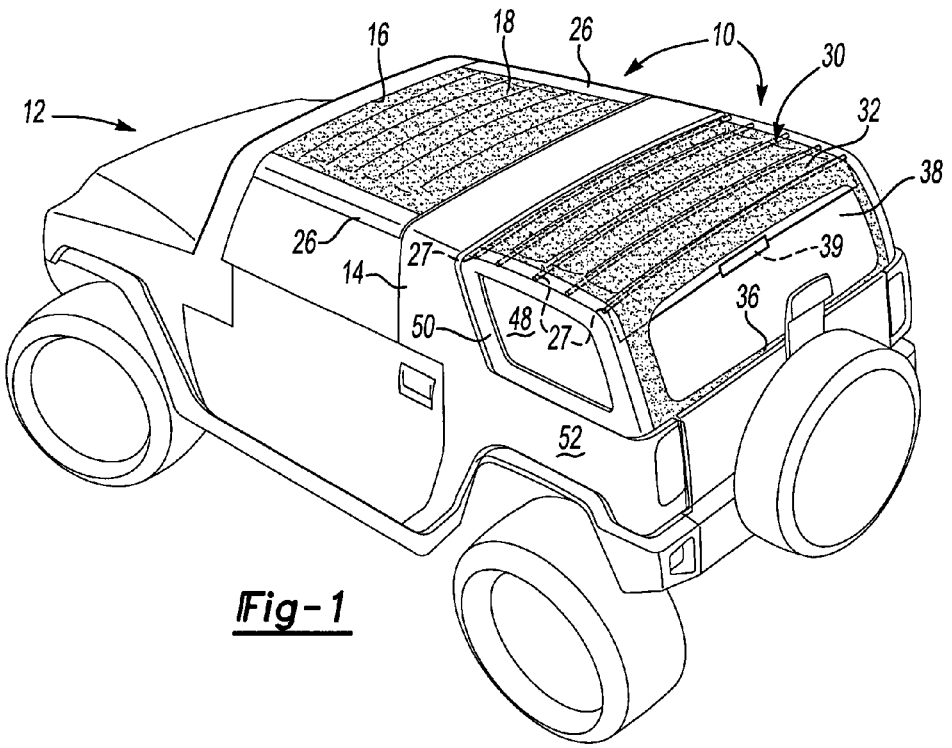
FIG. 1 is a rear perspective view of a sport utility vehicle having a front removable soft top panel and a rear removable soft top panel shown in their extended positions.
Figure 2:
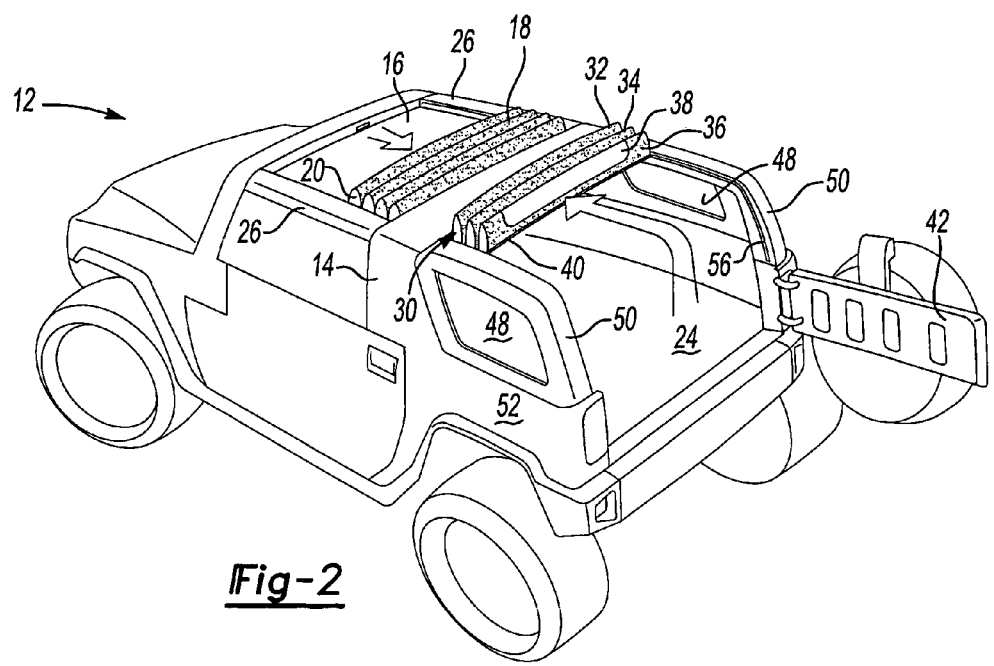
FIG. 2 is a rear perspective view of the sport utility vehicle having a front removable soft top panel and a rear removable soft top panel shown with the front and rear roof panels being retracted into two cassettes and being ready for removal.
Figure 3:
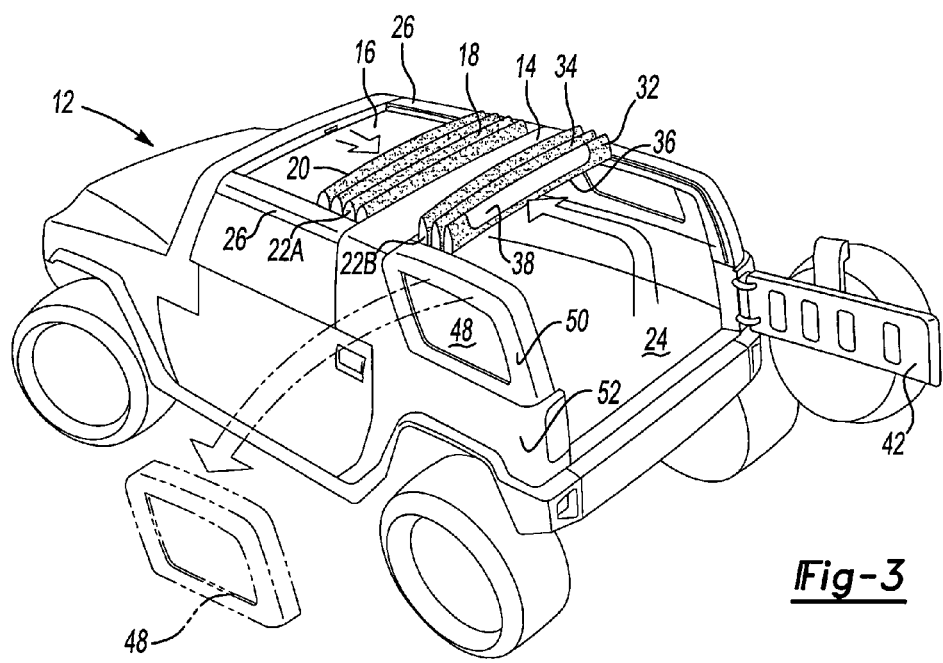
FIG. 3 is a fragmentary rear perspective view of the sport utility vehicle having front and rear flexible panel cassettes retracted with rigid side panel modules assembled to the rear quarter panels of the vehicle.
Figure 4:
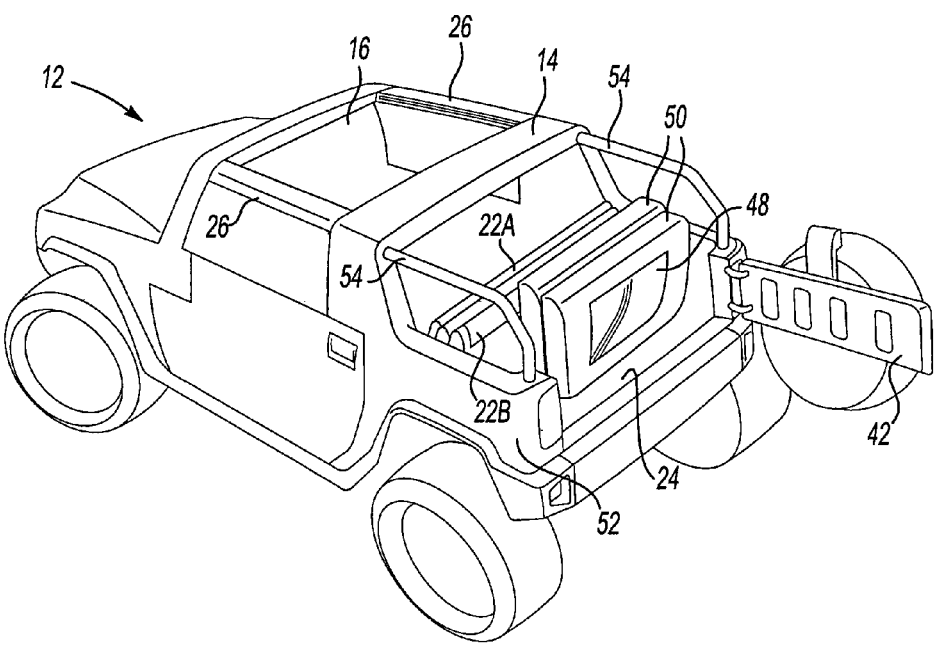
FIG. 4 is a fragmentary rear perspective view of the sport utility vehicle having front and rear flexible roof section cassettes removed and stored in the storage compartment of the vehicle and also showing rigid side panel modules removed from the vehicle exterior and stored in the storage compartment of the vehicle.

Referring to FIGS. 1-4, a soft top modular convertible top 10 is shown in conjunction with a vehicle 12. The top 10 is used in conjunction with a permanent roof hoop 14 located behind the front seat of the sport utility vehicle 12. An opening 16 in a front roof area above the driver is selectively closable by means of a retraction mechanism that folds the canvas roof section 18. As shown in FIG. 2, the canvas roof section 18 is folded into a series of pleats 20 as it is retracted rearwardly toward the roof hoop 14. As shown in FIGS. 3 and 4, the canvas roof section 18 after being retracted may be removed as a cartridge 22A and stored in the rear storage area 24 of the vehicle 12.

Removable side rails 26 are provided above the driver and front passenger windows. The removable side rails 26 are adapted to receive the ends 27 of bows extending through the cloth material of canvas roof section 18. The roof section 18 above the driver and front seat passengers and side rails 26 can be removed to provide a fully open area and can be stored in the rear storage area 24 of the vehicle 12. The roof section 18 is intended to be moved manually, however it is also conceivable that a power retraction system could be developed for this application.

The rear portion 30 of the convertible top 10 is also removable. The rear portion 30 includes a cloth or canvas section 32 that is folded in a series of pleats 34. The rear portion 30 extends from a bottom portion 36 of a back light 38 to the roof hoop 14. A bar 40 may be provided at the top of a tailgate 42 and bottom of the back light 38 that can be rolled with the rear portion 30 initially upwardly, where it then may be released from a clamping mechanism 39 located near the upper rear corner of the back light 38 and retracted forwardly toward the roof hoop 14. The rear portion 30 of the top 10 then may be removed as a cartridge 22B and stored in the back 24 of the vehicle 12.

Rear side lights 48 are provided in a pair of rigid body panels 50 that are received on top of the rear quarter panels 52 and extend to the top portion, or canvas section 32, of the roof. The body panels 50 extend from a point adjacent the back light 38 of the vehicle to the roof hoop 14. The body panels 50 and side lights 48 can be removed from the vehicle 12 and placed in the storage compartment 24 with the other parts of the roof system. The rear side lights 48 may be clear or tinted polycarbonate or class panels that function as side windows.

Tubular sports bars 54 extend from the roof hoop 14 to the rear quarter panel 52. The sports bars 54 are not essential to this design, but can be provided if desired. The rigid body panels 50 are clamped by a pinning arrangement or latch mechanism to the sides of the roof hoop 14 and top of the rear quarter panels 52. The rigid body panels 50 can also be secured by brackets or clamping members to the sports bars 54, if sports bars 54 are included in the design. The rigid body panels 50 may also include tracks 56 that receive ends of bows extending through the cloth roof section 32.

Figure 5:
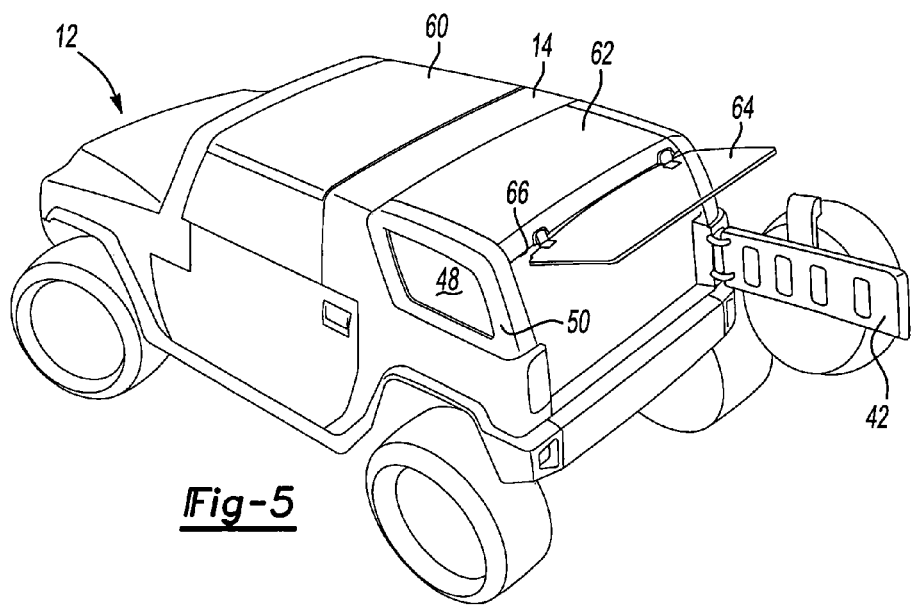
FIG. 5 is a rear perspective view of the sport utility vehicle having rigid panels covering the front portion of the passenger compartment and the rear storage area.
Figure 6:
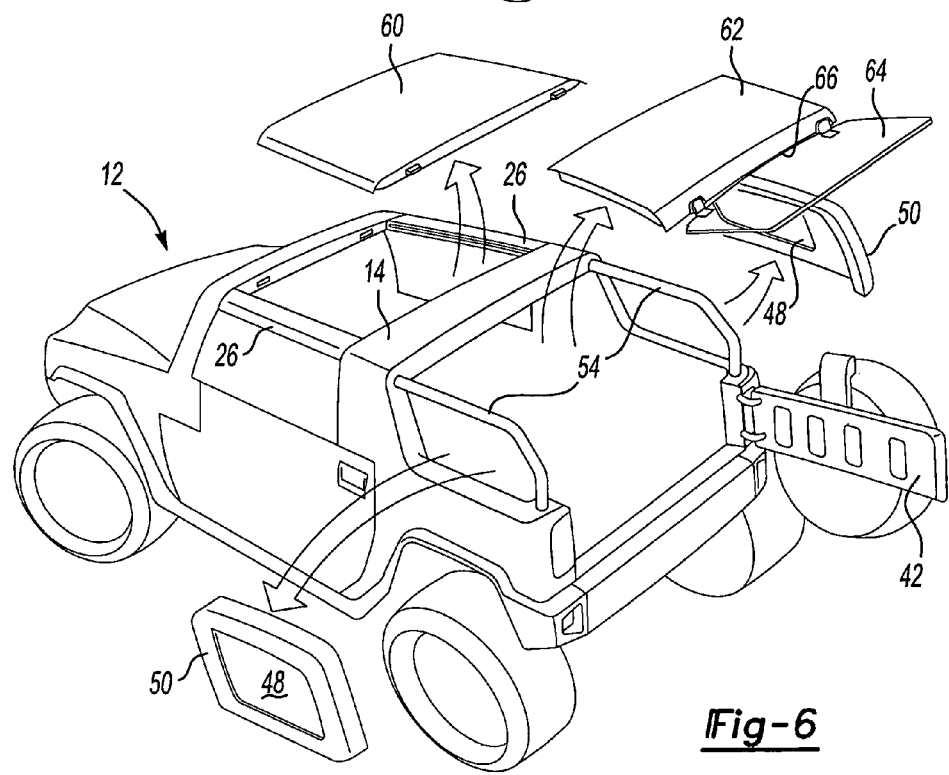
FIG. 6 is an exploded rear perspective view showing the sport utility vehicle having removable rigid panels with the front roof panel, rear roof panel rigid side panels shown separated from the vehicle.

Referring to FIGS. 5 and 6, a hard top roof system is illustrated. The canvas or cloth roof portions 18 and 32 can be removed from the vehicle and replaced by a front rigid panel 60 and a rear rigid panel 62. The front panel 60 can be assembled to the same latching hardware as the cloth roof portion 18. The front panel 60 is secured to the side rails 26 that are located above the driver and front passenger windows. The rear rigid panel 62 may be received by the top edges of the side panel modules 50 and the rear edge of the roof hoop 14. The rear panel 62 is secured by the same latch hardware and slides that receive the ends of the roof bows for the cloth rear roof portion 32. A hinged glass back light 64 may be secured to a rear edge 66 of the hard rear roof panel 62 and may also include a windshield wiper, rear defrost, windshield washer, and the like. The rear roof panel 62 may be used with the same side panel modules 50 as the soft top 32 and can be provided with or without the tubular sports bars 54.

Figure 7:
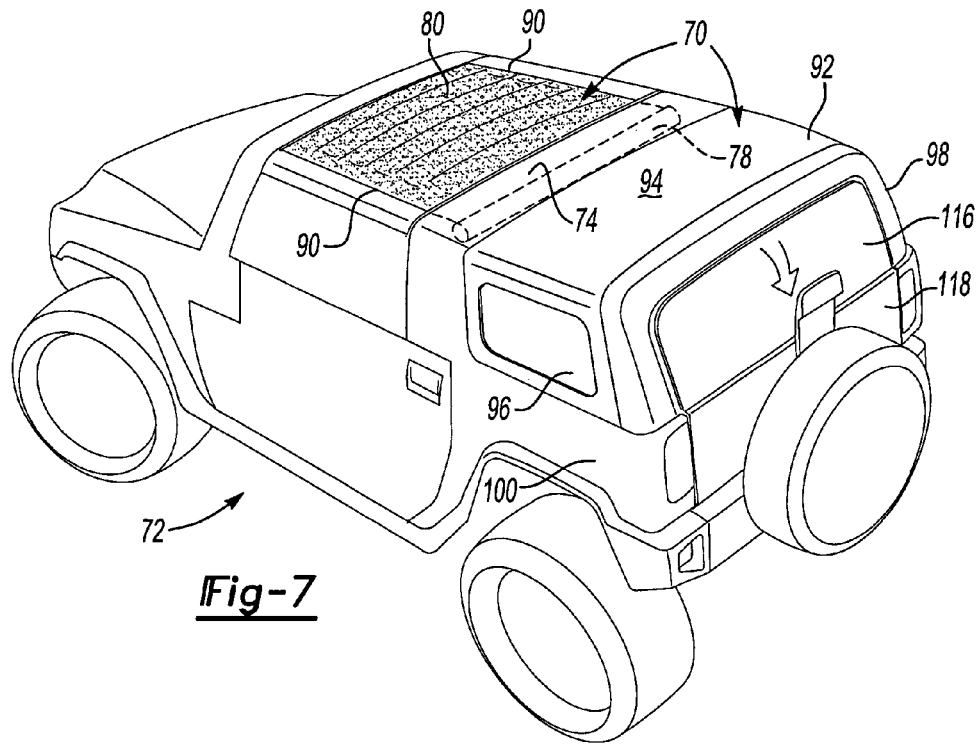
FIG. 7 is a rear perspective view of a sport utility vehicle having front and rear soft top panels shown in their extended positions.
Figure 8:
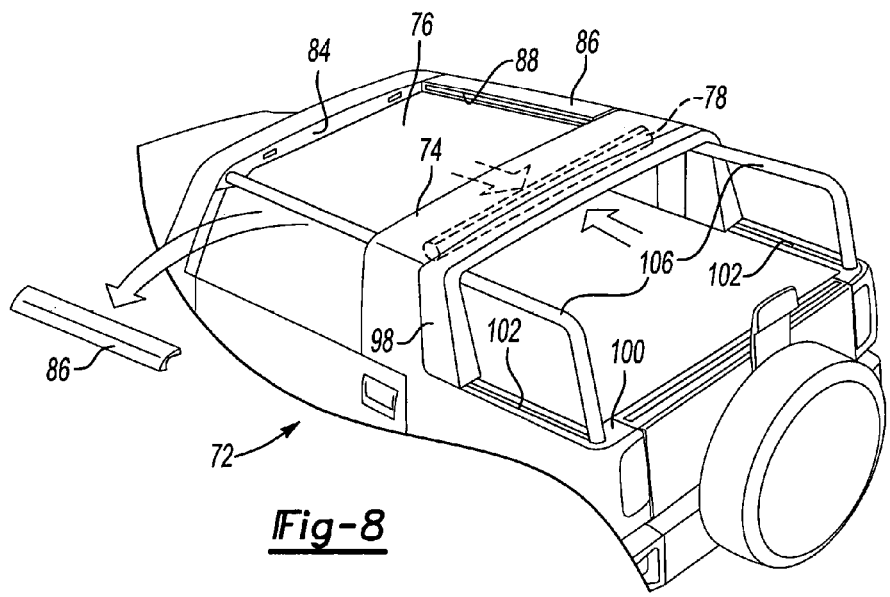
FIG. 8 is a rear perspective view of the sport utility vehicle having front and rear soft top panels shown with the front and rear roof panels retracted.

Referring to FIGS. 7 and 8, a soft top modular convertible top 70 is shown in conjunction with a vehicle 72. The top 70 is used in conjunction with a permanent roof hoop 74 located behind the front seat of the sport utility vehicle 72. An opening 76 in a front roof area above the driver is selectively closed by means of a roller mechanism 78 housed within the roof hoop 74. The roller mechanism 78 allows the roll carried retractable roof section 80 to be unreeled into an extended position (FIG. 7). The retractable roof section 80 is secured to a latching mechanism (not shown) that is of conventional design on the roof header 84.

Removable side rails 86 may be provided above the driver and front passenger windows. The removable side rails 86 include a channel 88 to which the sides 90 of the retractable roof section 80 are secured. The roof section 80 above the driver and front seat passengers and side rails 86 can be removed to provide a fully open area. The removable side rails 86 can be stored in the back of the vehicle 72.

The rear roof section 92 of the convertible top 70 is retractable. The rear roof section 92 is formed by an intermediate soft cloth top portion 94 that would also include flexible clear side lights 96. The back light module 98 is a rigid frame that is movable in a sliding arrangement (FIG. 2). The back light frame 98 is connected to the top edge of the rear quarter panels 100 by means of a slot or track 102 in which a downwardly extending pin or lower slide member associated with the back light module 98 is movable. The rear roof section 92 also includes cables (not shown) that extend through the rear roof section 92 and are secured at spaced locations to the rear roof section 92. The cables cause the rear roof section 92 to form pleats as it is folded towards the roof hoop 74. The rigid frame of the back light module 98 can be configured to cover the soft cloth to portion 94. Spring-biased cable take-up reels (not shown) can be provided on both sides of the roof hoop 74. Spring-biased cable take-up reels could also be provided at spaced locations on the upper portion of the roof hoop 74.

Tubular sports bars 106 extend from the roof hoop 74 to the rear quarter panels 100. The sports bars 106 are not essential to this design, but can be provided if desired.

The illustrated embodiments are manually retracted sections, however both the retractable roof section 80 and the rear roof section 92 could be moved by means of a power system, for example, a hydraulic cylinder, cable drive, or a ball and screw arrangement.

Figure 9:
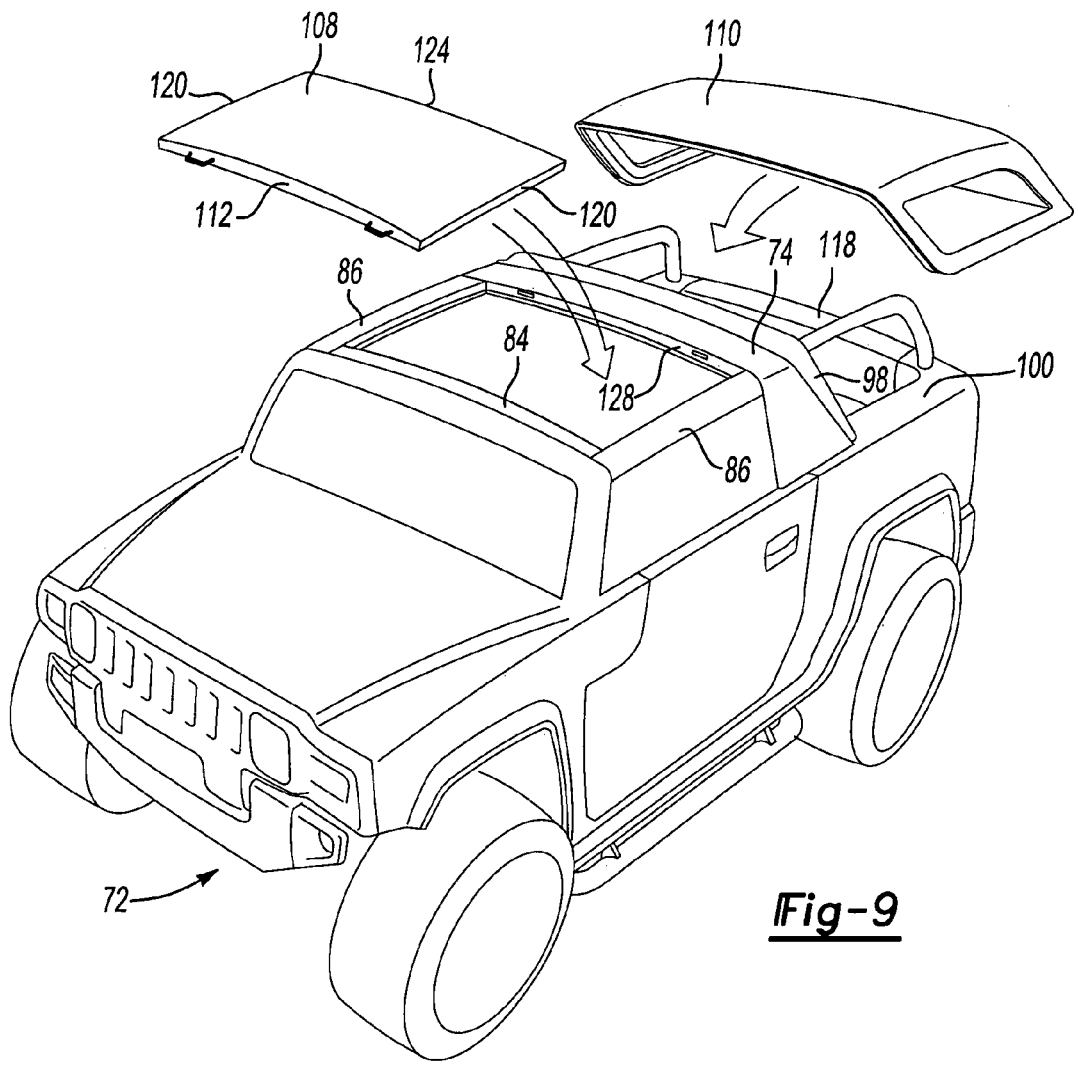
FIG. 9 is a front perspective view of the sport utility vehicle having front and rear soft top panels retracted and with a front rigid roof panel being installed.

FIG. 9 shows a hard top embodiment. The hard tops are installed after the retractable roof section 80 and the rear roof section 92 are retracted. The front edge 112 of the rigid roof panel 108 is received by the latching mechanism (not shown) of conventional design on the roof header 84. The sides 120 of the rigid roof panel 108 are received by the removable side rails 86. The rear edge 124 of the rigid roof panel 108 would be secured by a latch or pins to the roof hoop 74 or front edge of the retractable roof section 80. The retractable roof section 80 is retained by the roller mechanism 78 and need not be removed from the roof hoop 74 to install the front rigid roof panel 108.

The rear rigid roof shell 110 is attached to the vehicle 72 with pins or latches (not shown) provided on the front and lower edges of the rear rigid roof shell 110 to securely fasten it to the retracted back light frame 98 and the upper surfaces of the rear quarter panels 100. The rear back light (not shown) on the rigid roof shell 110 may be a hinged glass back light (similar to the backlight shown and described with reference to FIG. 13 below) and can be provided with a windshield wiper, windshield washers, and defrosting mechanism. Electrical accessories provided on the rigid roof shell 110 are connected to the vehicle 72 by means of a wiring harness. The wiring harness could also include quick-connect connectors that automatically connect to the vehicle wiring when the rigid removable top 110 is secured to the vehicle 72.

Figure 10:
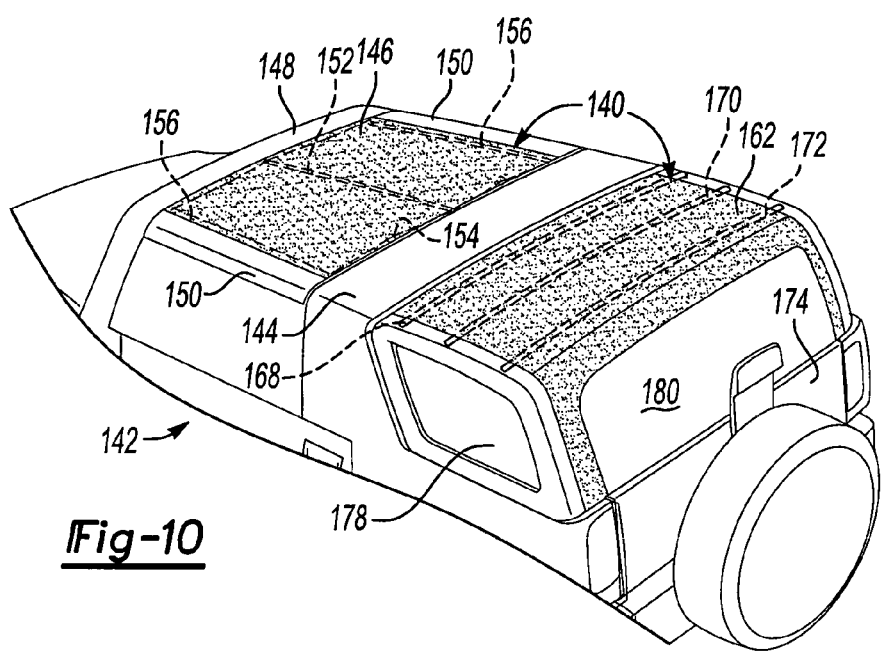
FIG. 10 is a rear perspective view of a sport utility vehicle having a front removable soft top panel and a rear retractable soft top panel shown in their extended positions.
Figure 11:
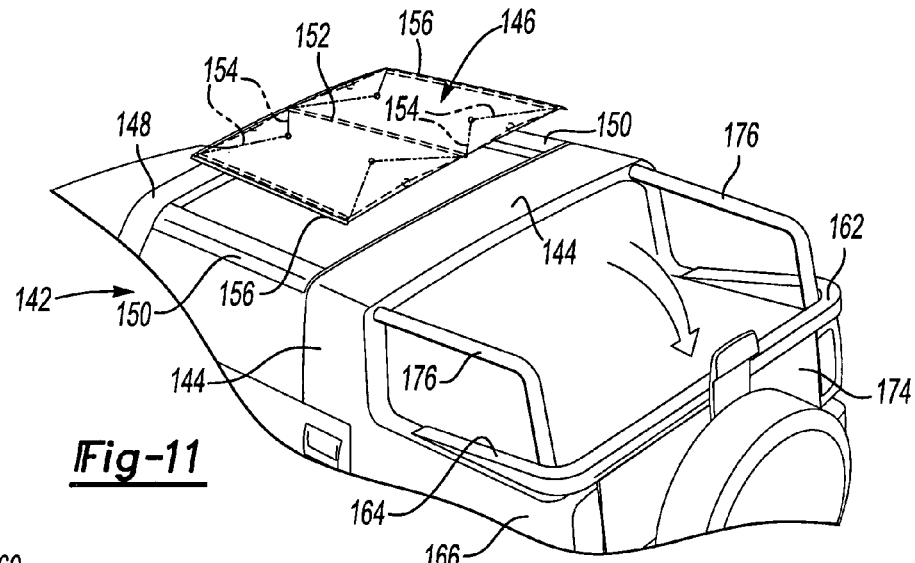
FIG. 11 is a rear perspective view of the sport utility vehicle having a front removable soft top panel and a rear retractable soft top panel shown with the front soft top panel being removed and the rear roof panel being retracted.
Figure 12:
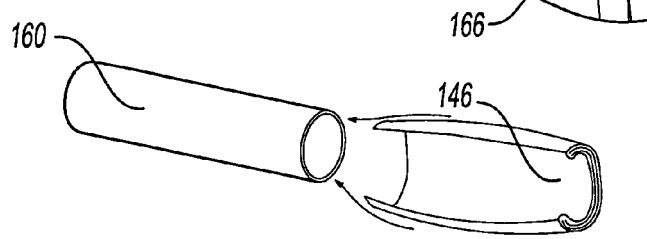
FIG. 12 is a perspective view of a bag-like container for storing the front soft top panel.

Referring to FIGS. 10-12, a soft top modular convertible top 140 is shown in conjunction with a vehicle 142. The top 140 is used in conjunction with a permanent roof hoop 144 located behind the front seat of the sport utility vehicle 142. A front soft top module 146 is provided between the windshield header 148 and the roof hoop 144. The top module 146 includes two removable side rails 150 that are removed with the top module 146 and are covered by the soft top module material. A central fore and aft extending bow 152 is provided in the center of the roof. The center bow 152 is connected on the front and rear by pivoting scissor links 154 to the side rails 156. The scissor links 154 are connected to each other and adapted to be folded on the front edge toward the rear and on the rear edge toward the front of the vehicle 142. The pivoting links 154 provide fore and aft support for the front and rear edges of the soft top module 146. When the soft top module 146 is removed from the vehicle 142, it may be folded and stored in a bag-like container 160 for convenience.

The rear soft top module 162 includes a cloth top that is supported on a retractable linkage mechanism 164. The retractable linkage mechanism 164 is connected to the vehicle 142 behind the roof hoop 144 on the top edge of the rear quarter panel 166. A one bow 168 in its extended position would be secured to the roof hoop 144 and a two bow 170 is articulately connected to the one bow 168. A three bow 172 is pivotally connected to the rear portion of the rear quarter panel 166. As the three bow 172 retracts, the bottom of the three bow 172 shifts forward toward the one bow 168 so that the bows 168, 170, 172 overlie one another at the top edge of the rear tailgate 174.

Tubular sports bars 176 extend from the roof hoop 174 to the rear quarter panel 166. The sports bars 176 are not essential to this design, but can be provided if desired. The side light modules 178 and back light 180 are each made of soft foldable clear plastic. One feature of this invention is that no part of the top stack linkage 182 is visible through the side lights 178 of the vehicle 142.

Figure 13:
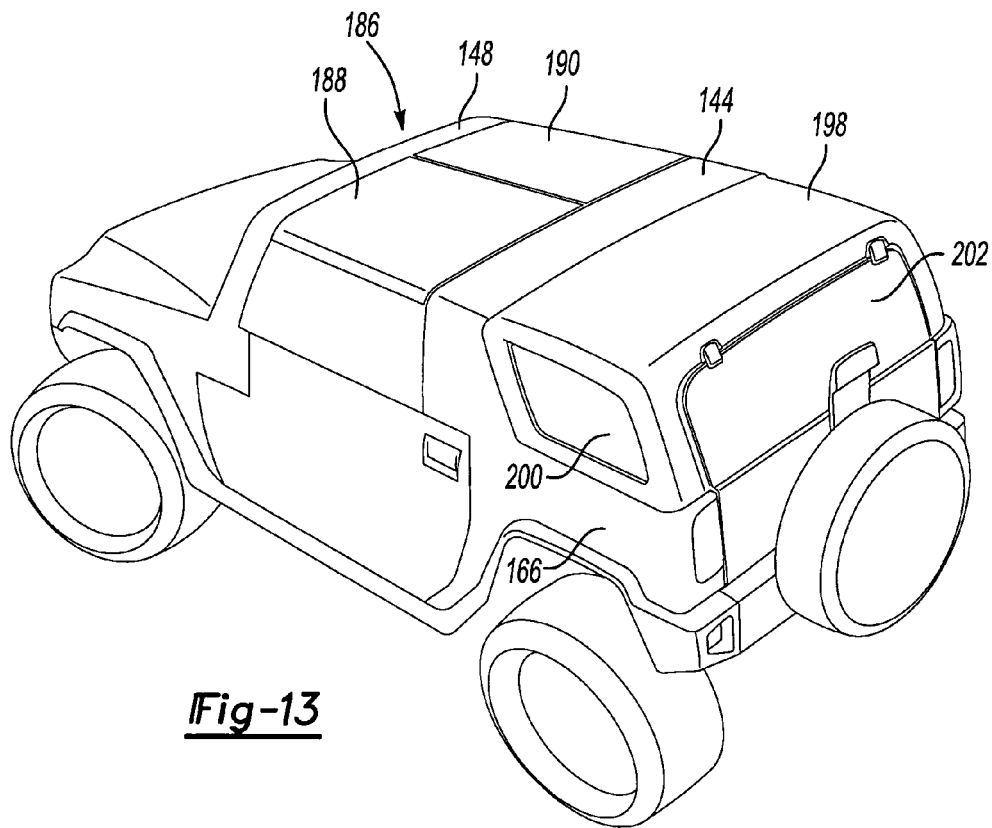
FIG. 13 is a rear perspective view of the sport utility vehicle shown with the front soft top panel removed, the rear soft top panel retracted, and a hard top roof system installed.

Referring to FIGS. 13 and 14, a hard top for this roof system is provided. A Targa top roof 186 is provided in which two rigid panels 188, 190 are secured between the windshield header 148 and the roof hoop 144. The rigid panels 188, 190 would be provided without a fore and aft extending central channel. Instead, rigid panels 188, 190 are formed with integral supports in the form of mating channels 192, 194 including water seals that extend fore and aft. The rigid panels 188, 190 are latched to the windshield header 148 and the roof hoop 144 with latching hardware corresponding to the hardware used to secure the soft cover roof. The rigid panels 188, 190 may be formed of polycarbonate, or other suitable materials.

Referring to FIG. 15, two alternate embodiments of rigid panels for the Targa top roof 186 are shown. In one of the front roof panels 186, a skylight 196, or "moon roof," is shown.

The removable rear hard top 198 is designed to encompass the rearwardly retracted soft top module 162. The rear hard top 198 is secured to the rear edge of the roof hoop 144 and to the upper surfaces of the rear quarter panel 166 by means of appropriate latches and pins. The removable rear hard top 198 is outboard of the retracted soft top module 162 when the soft top module 162 is retracted. The rear hard top 198 would include rigid side lights 200 and a rear back light 202 that would be hinged and provided with a windshield wiper, windshield washer and defroster. Any electrical elements would be connected by means of a wiring harness, including quick-connects.

Figure 17:
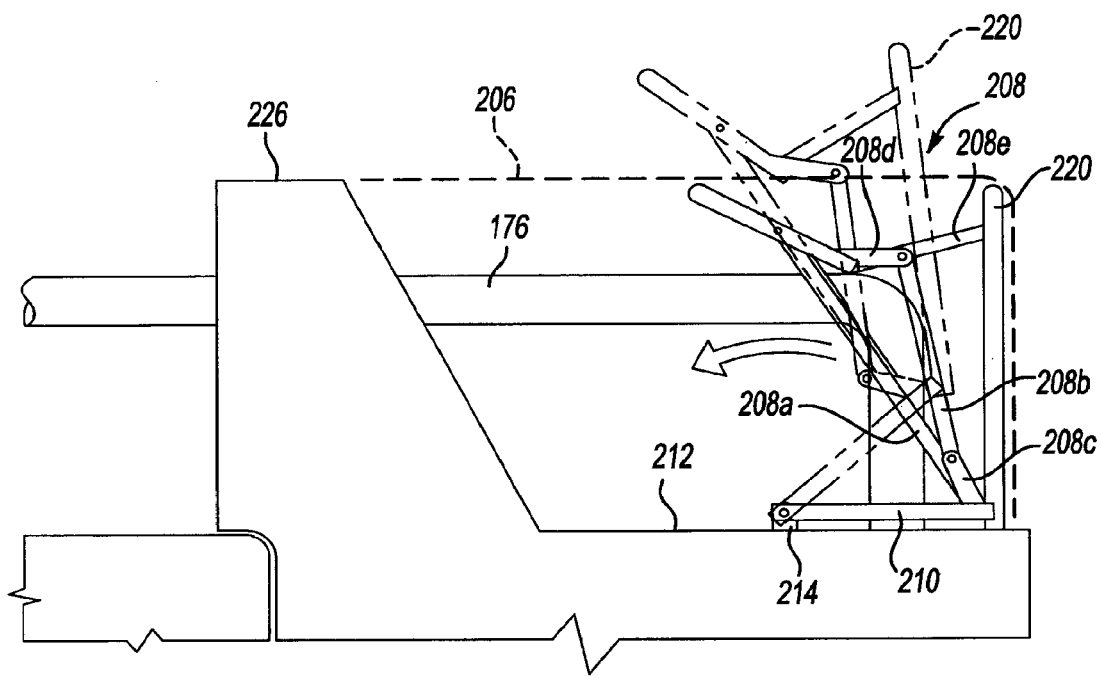
FIG. 17 is a fragmentary side elevation view of a sport utility vehicle having an articulated support frame for a removable rear roof section as shown in FIG. 16 in an intermediate retraction position.
Figure 18:
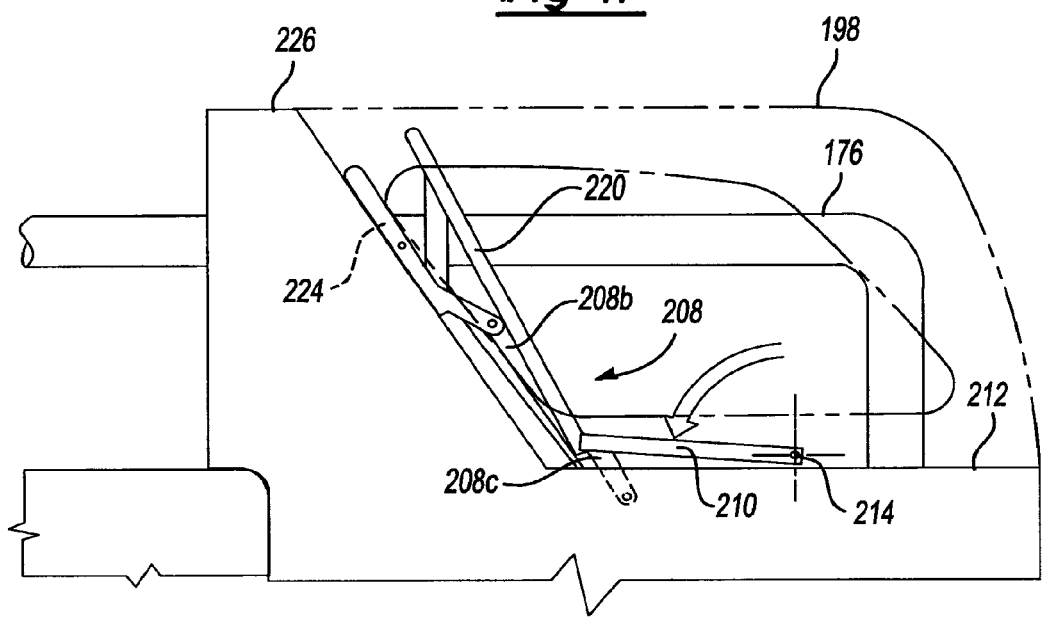
FIG. 18 is a fragmentary side elevation view of a sport utility vehicle having an articulated support frame for a removable rear roof section as shown in FIG. 16 in a fully retracted position.

Referring to FIGS. 16-18, a retractable linkage mechanism 208 for a rear soft top module that includes a cloth top 206 is illustrated in three stages of retraction. The rear soft top module may include a roll-up rear back light (not shown) that is first rolled up prior to beginning the retraction cycle. Alternatively, the rear back light may retract into the tailgate as with the embodiment of FIG. 7 above. The retractable linkage mechanism 208 includes a link 210 that extends along the top of the rear quarter panel 212 from a pivot bracket 214 at approximately the mid-point of the top of the rear quarter panel 212. A rear bow 220 extends above and around both sides of the rear back light. The rear bow 220 is articulately connected to the retractable linkage mechanism 208 including the rear link 210. An intermediate bow 224 is connected to the rear bow 220 and supports the cloth soft top 206 intermediate the rear bow 220 and roof hoop 226. The linkage mechanism 208 for the intermediate bow 224 is disposed rearward of a side light (not shown, but similar to side light 200) so that it is not visible when the rear module is in place. A cable or retractable strap may be provided with a retraction spool. The cable or retractable straps are connected at spaced locations on the soft top to control the folding of the soft top 206. As the rear bow 220 retracts, it is initially raised on the rear bow 210 and moves forward toward the intermediate bow 224 so that the bows 220, 224 overlie one another and are adjacent to the roof hoop 226, as shown in FIG. 18. A hard shell rear roof like that shown in FIG. 13 could be provided with the embodiment of FIGS. 16-18.

The retractable linkage mechanism 208 includes a first link 208a that extends from the intermediate bow 224 to a connection point on its lower end with a second link 208b and a third link 208c, as shown in FIGS. 16-18. The second link 208b extends from the connection point with the first link 208a to a fourth link 208d and fifth link 208e on its upper end. The rear bow 220 has ends that extend to the rear quarter panel 212. The intermediate bow 224 is a U-shaped member that has ends that are assembled to the rear quarter panel 212 of the vehicle indirectly through the linkage 208 and more specifically through the links 208a and 208c and also through the links 208d and 208b and 208c. The bows are assembled to the rear quarter panel 212 by means of a pivot bracket 214 that is located at the mid-point of the top of the rear quarter panel 212.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A retractable linkage for a rear soft top module for a vehicle that has a pair of rear quarter panels, the vehicle including a flexible fabric top that has an extended position and a retracted position, and the vehicle having a permanent hoop that divides a roof area into a front roof area and a rear roof area, wherein the rear roof area is covered by the rear soft top module in the extended position, the linkage comprising:
   a pair of pivot brackets each assembled to a top portion of each of the rear quarter panels at an intermediate point on the top portion of each of the rear quarter panel panels;
   a pair of attachment links pivotally connected on a pivoting end to each of the pivot brackets that is the sole connection on each side of the retractable linkage to the vehicle;
   a rear bow that extends about the sides and top of a rear back light when the soft top is in an extended position and the rear bow is disposed at the back of the rear roof area, the rear bow having two ends that are attached to a distal end of each of the attachment links;
   an intermediate bow connected to the rear bow and the attachment links by a plurality of articulated intervening links;
   wherein each of the attachment links extend in a rearward vehicle direction from the pivot bracket to the rear bow when the soft top module is in the extended position, and wherein each of the attachment links extend in a forward vehicle direction from the pivot bracket in the retracted position;
   wherein the rear bow is moved by pivoting each of the attachment links in an arcuate path above the pair of pivot brackets from the back of the rear roof area to a position behind and proximate the permanent hoop;
   wherein the intermediate bow is moved by the intervening links from a location intermediate the permanent hoop and the rear bow in the extended position to a location beside the permanent hoop in the retracted position; and
   wherein the linkage is not directly connected to the permanent hoop in the extended position in that only the rear soft top extends between the linkage and the permanent hoop.

2. The roof system of claim 1 wherein when the rear bow is in the retracted position, a rigid shell top may be assembled over the rear roof area.

3. The roof system of claim 1 wherein the rear bow and the intermediate bow are inverted U-shaped members having ends that are assembled by a linkage to a quarter panel of the vehicle in a moveable relationship.

* * * * *